US012167119B2

(12) United States Patent
Neghina et al.

(10) Patent No.: US 12,167,119 B2
(45) Date of Patent: Dec. 10, 2024

(54) DETECTING FACIAL EXPRESSIONS IN DIGITAL IMAGES

(71) Applicant: Adeia Imaging LLC, San Jose, CA (US)

(72) Inventors: Catalina Neghina, Bucharest (RO); Mihnea Gangea, Bucharest (RO); Stefan Petrescu, Bucharest (RO); Emilian David, Bucharest (RO); Petronel Bigioi, Galway (IE); Eric Zarakov, Los Gatos, CA (US); Eran Steinberg, San Francisco, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/340,448

(22) Filed: Jun. 23, 2023

(65) Prior Publication Data
US 2023/0421886 A1 Dec. 28, 2023

Related U.S. Application Data

(63) Continuation of application No. 17/643,162, filed on Dec. 7, 2021, now Pat. No. 11,689,796, which is a
(Continued)

(51) Int. Cl.
H04N 23/611 (2023.01)
G06V 40/16 (2022.01)
H04N 23/61 (2023.01)

(52) U.S. Cl.
CPC ......... *H04N 23/611* (2023.01); *G06V 40/161* (2022.01); *G06V 40/166* (2022.01);
(Continued)

(58) Field of Classification Search
CPC ........... H04N 5/23219; G06K 9/00302; G06K 9/00281; G06V 40/174; G06V 40/172;
(Continued)

(56) References Cited

U.S. PATENT DOCUMENTS 4,047,187 A   9/1977  Mashimo et al.
4,299,464 A  11/1981  Cushman
(Continued)

FOREIGN PATENT DOCUMENTS

CN   1487473 A   4/2004
CN   1723467 A   1/2006
(Continued)

OTHER PUBLICATIONS

Claims in Korean Application No. 10-2010-7016964, Dated Jun. 2015, 4 Pgs.
(Continued)

*Primary Examiner* — Ruiping Li
(74) *Attorney, Agent, or Firm* — KPPB LLP

(57) ABSTRACT

A method and system for detecting facial expressions in digital images and applications therefore are disclosed. Analysis of a digital image determines whether or not a smile and/or blink is present on a person's face. Face recognition, and/or a pose or illumination condition determination, permits application of a specific, relatively small classifier cascade.

21 Claims, 5 Drawing Sheets

Related U.S. Application Data continuation of application No. 17/020,535, filed on Sep. 14, 2020, now Pat. No. 11,470,241, which is a continuation of application No. 15/948,848, filed on Apr. 9, 2018, now Pat. No. 10,778,885, which is a continuation of application No. 15/284,280, filed on Oct. 3, 2016, now Pat. No. 9,942,470, which is a continuation of application No. 14/300,150, filed on Jun. 9, 2014, now Pat. No. 9,462,180, which is a continuation of application No. 12/354,707, filed on Jan. 15, 2009, now Pat. No. 8,750,578.

(60) Provisional application No. 61/024,508, filed on Jan. 29, 2008, provisional application No. 61/023,855, filed on Jan. 27, 2008.

(52) U.S. Cl.
CPC .......... G06V 40/171 (2022.01); G06V 40/172 (2022.01); G06V 40/174 (2022.01); G06V 40/175 (2022.01); H04N 23/61 (2023.01)

(58) Field of Classification Search
CPC .. G06V 40/171; G06V 40/166; G06V 40/161; G06V 40/165
USPC ...................................................... 348/222.1
See application file for complete search history.

(56) References Cited

U.S. PATENT DOCUMENTS

| | | |
|---|---|---|
| 4,317,991 A | 3/1982 | Stauffer |
| 4,367,027 A | 1/1983 | Stauffer |
| RE31,370 E | 9/1983 | Mashimo et al. |
| 4,638,364 A | 1/1987 | Hiramatsu |
| 5,018,017 A | 5/1991 | Sasaki et al. |
| RE33,682 E | 9/1991 | Hiramatsu |
| 5,063,603 A | 11/1991 | Burt |
| 5,164,831 A | 11/1992 | Kuchta et al. |
| 5,164,992 A | 11/1992 | Turk et al. |
| 5,227,837 A | 7/1993 | Terashita |
| 5,280,530 A | 1/1994 | Trew et al. |
| 5,291,234 A | 3/1994 | Shindo et al. |
| 5,311,240 A | 5/1994 | Wheeler |
| 5,384,912 A | 1/1995 | Ogrinc et al. |
| 5,430,809 A | 7/1995 | Tomitaka |
| 5,432,863 A | 7/1995 | Benati et al. |
| 5,488,429 A | 1/1996 | Kojima et al. |
| 5,496,106 A | 3/1996 | Anderson |
| 5,572,596 A | 11/1996 | Wildes et al. |
| 5,576,759 A | 11/1996 | Kawamura et al. |
| 5,633,678 A | 5/1997 | Parulski et al. |
| 5,638,136 A | 6/1997 | Kojima et al. |
| 5,680,481 A | 10/1997 | Prasad et al. |
| 5,684,509 A | 11/1997 | Hatanaka et al. |
| 5,692,065 A | 11/1997 | Prakash et al. |
| 5,706,362 A | 1/1998 | Yabe |
| 5,710,833 A | 1/1998 | Moghaddam et al. |
| 5,724,456 A | 3/1998 | Boyack et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,802,220 A | 9/1998 | Black et al. |
| 5,802,361 A | 9/1998 | Wang et al. |
| 5,805,720 A | 9/1998 | Suenaga et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,870,138 A | 2/1999 | Smith et al. |
| 5,963,656 A | 10/1999 | Bolle et al. |
| 5,978,519 A | 11/1999 | Bollman et al. |
| 5,991,456 A | 11/1999 | Rahman et al. |
| 6,053,268 A | 4/2000 | Yamada |
| 6,072,903 A | 6/2000 | Maki et al. |
| 6,097,470 A | 8/2000 | Buhr et al. |
| 6,101,271 A | 8/2000 | Yamashita et al. |
| 6,115,509 A | 9/2000 | Yeskel |
| 6,128,397 A | 10/2000 | Baluja et al. |
| 6,148,092 A | 11/2000 | Qian |
| 6,151,073 A | 11/2000 | Steinberg et al. |
| 6,188,777 B1 | 2/2001 | Darrell et al. |
| 6,192,149 B1 | 2/2001 | Eschbach et al. |
| 6,249,315 B1 | 6/2001 | Holm |
| 6,263,113 B1 | 7/2001 | Abdel-Mottaleb et al. |
| 6,268,939 B1 | 7/2001 | Klassen et al. |
| 6,282,317 B1 | 8/2001 | Luo et al. |
| 6,301,370 B1 | 10/2001 | Steffens et al. |
| 6,301,440 B1 | 10/2001 | Bolle et al. |
| 6,332,033 B1 | 12/2001 | Qian |
| 6,360,021 B1 | 3/2002 | Mccarthy et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | Deluca |
| 6,421,468 B1 | 7/2002 | Ratnakar et al. |
| 6,438,264 B1 | 8/2002 | Gallagher et al. |
| 6,456,732 B1 | 9/2002 | Kimbell et al. |
| 6,456,737 B1 | 9/2002 | Woodfill et al. |
| 6,459,436 B1 | 10/2002 | Kumada et al. |
| 6,473,199 B1 | 10/2002 | Gilman et al. |
| 6,501,857 B1 | 12/2002 | Gotsman et al. |
| 6,501,942 B1 | 12/2002 | Weissman et al. |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,556,708 B1 | 4/2003 | Christian et al. |
| 6,606,397 B1 | 8/2003 | Yamamoto |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,754,389 B1 | 6/2004 | Dimitrova et al. |
| 6,760,465 B2 | 7/2004 | Mcveigh et al. |
| 6,765,612 B1 | 7/2004 | Anderson et al. |
| 6,801,250 B1 | 10/2004 | Miyashita |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,940,545 B1 | 9/2005 | Ray et al. |
| 6,965,684 B2 | 11/2005 | Chen et al. |
| 6,993,157 B1 | 1/2006 | Oue et al. |
| 6,996,340 B2 | 2/2006 | Yamaguchi et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,035,440 B2 | 4/2006 | Kaku |
| 7,035,456 B2 | 4/2006 | Lestideau |
| 7,035,467 B2 | 4/2006 | Nicponski |
| 7,038,709 B1 | 5/2006 | Verghese |
| 7,038,715 B1 | 5/2006 | Flinchbaugh |
| 7,050,607 B2 | 5/2006 | Li et al. |
| 7,064,776 B2 | 6/2006 | Sumi et al. |
| 7,082,212 B2 | 7/2006 | Liu et al. |
| 7,099,510 B2 | 8/2006 | Jones et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,174,033 B2 | 2/2007 | Yukhin et al. |
| 7,190,829 B2 | 3/2007 | Zhang et al. |
| 7,200,249 B2 | 4/2007 | Okubo et al. |
| 7,218,759 B1 | 5/2007 | Ho et al. |

(56) References Cited

U.S. PATENT DOCUMENTS

| | | |
|---|---|---|
| 7,227,976 B1 | 6/2007 | Jung et al. |
| 7,233,684 B2 | 6/2007 | Fedorovskaya et al. |
| 7,248,300 B1 | 7/2007 | Ono |
| 7,254,257 B2 | 8/2007 | Kim et al. |
| 7,274,822 B2 | 9/2007 | Zhang et al. |
| 7,274,832 B2 | 9/2007 | Nicponski |
| 7,315,631 B1 | 1/2008 | Corcoran et al. |
| 7,317,815 B2 | 1/2008 | Steinberg et al. |
| 7,408,581 B2 | 8/2008 | Gohda |
| 7,440,593 B1 | 10/2008 | Steinberg et al. |
| 7,551,755 B1 | 6/2009 | Steinberg et al. |
| 7,715,597 B2 | 5/2010 | Costache et al. |
| 7,738,015 B2 | 6/2010 | Steinberg et al. |
| 7,764,311 B2 | 7/2010 | Bill |
| 7,787,664 B2 | 8/2010 | Luo et al. |
| 7,804,983 B2 | 9/2010 | Steinberg et al. |
| 7,916,971 B2 | 3/2011 | Bigioi et al. |
| 8,005,268 B2 | 8/2011 | Steinberg et al. |
| 8,238,618 B2 | 8/2012 | Ogawa |
| 8,750,578 B2 | 6/2014 | Neghina et al. |
| 9,462,180 B2 | 10/2016 | Neghina et al. |
| 9,942,470 B2 | 4/2018 | Neghina et al. |
| 10,778,885 B2 | 9/2020 | Neghina et al. |
| 11,470,241 B2 | 10/2022 | Neghina et al. |
| 11,689,796 B2 | 6/2023 | Neghina et al. |
| 2001/0028731 A1 | 10/2001 | Covell et al. |
| 2001/0031142 A1 | 10/2001 | Whiteside |
| 2001/0040987 A1 | 11/2001 | Bjorn et al. |
| 2002/0090116 A1 | 7/2002 | Miichi et al. |
| 2002/0105482 A1 | 8/2002 | Lemelson et al. |
| 2002/0105662 A1 | 8/2002 | Patton et al. |
| 2002/0114535 A1 | 8/2002 | Luo |
| 2002/0172419 A1 | 11/2002 | Lin et al. |
| 2003/0025812 A1 | 2/2003 | Slatter |
| 2003/0052991 A1 | 3/2003 | Stavely et al. |
| 2003/0068100 A1 | 4/2003 | Covell et al. |
| 2003/0071908 A1 | 4/2003 | Ojima et al. |
| 2003/0160879 A1 | 8/2003 | Robins et al. |
| 2003/0169906 A1 | 9/2003 | Gokturk et al. |
| 2003/0190090 A1 | 10/2003 | Beeman et al. |
| 2004/0001616 A1 | 1/2004 | Gutta et al. |
| 2004/0088272 A1 | 5/2004 | Jojic et al. |
| 2004/0170397 A1 | 9/2004 | Ono |
| 2004/0175020 A1 | 9/2004 | Bradski et al. |
| 2004/0197013 A1 | 10/2004 | Kamei |
| 2004/0213482 A1 | 10/2004 | Silverbrook |
| 2004/0218916 A1 | 11/2004 | Yamaguchi et al. |
| 2004/0223629 A1 | 11/2004 | Chang |
| 2004/0223649 A1 | 11/2004 | Zacks et al. |
| 2004/0258304 A1 | 12/2004 | Shiota et al. |
| 2005/0013479 A1 | 1/2005 | Xiao et al. |
| 2005/0018925 A1 | 1/2005 | Bhagavatula et al. |
| 2005/0069208 A1 | 3/2005 | Morisada |
| 2005/0102246 A1 | 5/2005 | Movellan et al. |
| 2005/0169536 A1 | 8/2005 | Accomazzi et al. |
| 2005/0286802 A1 | 12/2005 | Clark et al. |
| 2006/0110014 A1 | 5/2006 | Philomin et al. |
| 2006/0177100 A1 | 8/2006 | Zhu et al. |
| 2006/0177131 A1 | 8/2006 | Porikli |
| 2006/0204106 A1 | 9/2006 | Yamaguchi |
| 2007/0025722 A1* | 2/2007 | Matsugu ............. G03B 17/16 348/E5.042 |
| 2007/0091203 A1 | 4/2007 | Peker et al. |
| 2007/0098303 A1 | 5/2007 | Gallagher et al. |
| 2007/0133901 A1 | 6/2007 | Aiso |
| 2007/0154095 A1 | 7/2007 | Cao et al. |
| 2007/0154096 A1 | 7/2007 | Cao et al. |
| 2007/0201725 A1 | 8/2007 | Steinberg et al. |
| 2007/0201750 A1 | 8/2007 | Ito et al. |
| 2007/0237421 A1 | 10/2007 | Luo et al. |
| 2008/0025576 A1 | 1/2008 | Li et al. |
| 2008/0144966 A1 | 6/2008 | Steinberg et al. |
| 2008/0192129 A1 | 8/2008 | Walker et al. |
| 2008/0310759 A1 | 12/2008 | Liu et al. |
| 2009/0109400 A1 | 4/2009 | Yoshinaga et al. |
| 2009/0135269 A1 | 5/2009 | Nozaki et al. |
| 2009/0190803 A1 | 7/2009 | Neghina et al. |
| 2010/0125799 A1 | 5/2010 | Roberts et al. |
| 2011/0069277 A1 | 3/2011 | Blixt et al. |
| 2011/0102553 A1 | 5/2011 | Corcoran et al. |
| 2011/0216943 A1 | 9/2011 | Ogawa |
| 2011/0234847 A1 | 9/2011 | Bigioi et al. |
| 2011/0235912 A1 | 9/2011 | Bigioi et al. |
| 2012/0218398 A1 | 8/2012 | Mehra |
| 2012/0219180 A1 | 8/2012 | Mehra |
| 2014/0347514 A1 | 11/2014 | Neghina et al. |
| 2017/0026567 A1 | 1/2017 | Neghina et al. |
| 2017/0357847 A1* | 12/2017 | Jabri ..................... G06T 7/73 |
| 2018/0295279 A1 | 10/2018 | Neghina et al. |
| 2021/0067686 A1 | 3/2021 | Neghina et al. |
| 2022/0103749 A1 | 3/2022 | Neghina et al. |

FOREIGN PATENT DOCUMENTS

| | | |
|---|---|---|
| CN | 102007499 A | 4/2011 |
| CN | 102007499 B | 3/2015 |
| EP | 1748378 A1 | 1/2007 |
| GB | 2370438 A | 6/2002 |
| JP | 1993260360 A | 10/1993 |
| JP | 8272948 A | 10/1996 |
| JP | 8272973 A | 10/1996 |
| JP | 2000347277 A | 12/2000 |
| JP | 2001067459 A | 3/2001 |
| JP | 2002199202 A | 7/2002 |
| JP | 2004294498 A | 10/2004 |
| JP | 2005003852 A | 1/2005 |
| JP | 2007088644 A | 4/2007 |
| JP | 2007249132 A | 9/2007 |
| JP | 2007306418 A | 11/2007 |
| JP | 2007329602 A | 12/2007 |
| JP | 2011511977 A | 4/2011 |
| JP | 5639478 B2 | 10/2014 |
| KR | 20100116178 A | 10/2010 |
| KR | 101615254 B1 | 4/2016 |
| WO | 2007060980 A1 | 5/2007 |
| WO | 2009095168 A1 | 8/2009 |

OTHER PUBLICATIONS

Communication Pursuant to Article 94(3) EPC, for European Patent Application No. 06789329.7, Dated Jul. 31, 2009, 5 Pgs.

Communication Pursuant to Article 94(3) EPC, for European Patent Application No. 06789329.7, Dated May 23, 2011, 5 Pgs.

Current Claims in China application No. 200980102866.0, Dated May 2014, 7 Pgs.

Current Claims in Japan Application No. 2013-17764, Dated Jun. 2014, 3 Pgs.

Extended European Search Report for European Application No. 06789329.7, Search completed Jan. 13, 2009, Mailed Jan. 22, 2009, 7 Pgs.

Extended European Search Report for European Application No. 06800683.2, Search Completed May 18, 2011, Mailed Jun. 29, 2011, 7 Pgs.

Final Office Action Mailed Mar. 24, 2010, for U.S. Appl. No. 11/460,225, filed Jul. 26, 2006.

Final Rejection, dated Jun. 3, 2013, for U.S. Appl. No. 13/035,907, filed Aug. 26, 2011.

International Preliminary Report on Patentability for International Application No. PCT/EP2009/000315, Report issued Aug. 3, 2010, Mailed Aug. 12, 2010, 7 Pgs.

International Search Report and Written Opinion for International Application No. PCT/EP2009/000315, Search completed Apr. 7, 2009, Mailed Apr. 29, 2009, 12 Pgs.

International Search Report and Written Opinion for International Application No. PCT/US2006/30173, Search completed Sep. 24, 2007, Mailed Nov. 1, 2007, 6 Pgs.

International Search Report and Written Opinion for International Application No. PCT/US2006/30315, Search completed Feb. 19, 2007, Mailed May 2, 2007, 8 Pgs.

(56) References Cited

OTHER PUBLICATIONS

Japan Patent Office, "Notification of Reasons for Refusal" in Application No. 2013-17764, Dated Jun. 17, 2014, 4 Pgs.
Korean Claims in Application No. 10-2010-7016964, Dated Nov. 2014, 3 Pgs.
Korean Intellectual Property Office, "Notice of Non-Final Rejection" in Application No. 10-2010-7016964, Dated Nov. 24, 2014, 11 Pgs.
Korean Intellectual Property Office, "Search Report" in Application No. 10-2010-7016964, Dated Jun. 30, 2015, 7 Pgs.
Non-final Office Action Dated Jul. 22, 2013, for U.S. Appl. No. 13/219,569, filed Aug. 26, 2011.
Non-final Office Action Mailed Dec. 4, 2012, for U.S. Appl. No. 13/035,907, filed Feb. 25, 2011.
Non-final Office Action Mailed Feb. 15, 2022, for U.S. Appl. No. 17/643,162 Filed Dec. 7, 2021, 13 pgs.
Non-final Office Action Mailed Mar. 25, 2010, for U.S. Appl. No. 11/460,218, filed Jul. 26, 2006.
Non-final Office Action Mailed Sep. 21, 2009, for U.S. Appl. No. 11/460,218, filed Jul. 26, 2006.
Non-final Office Action Mailed Sep. 22, 2009, for U.S. Appl. No. 11/460,225, filed Jul. 26, 2006.
Notice of Allowance Mailed Aug. 20, 2010, for U.S. Appl. No. 11/460,225, filed Jul. 26, 2006.
Notice of Allowance Mailed Jul. 13, 2010, for U.S. Appl. No. 11/460,225, filed Jul. 26, 2006.
Notice of Allowance Mailed Jun. 8, 2012, for U.S. Appl. No. 13/191,239, filed Jul. 26, 2011.
Notice of Allowance Mailed Jun. 29, 2010, for U.S. Appl. No. 11/460,218, filed Jul. 26, 2006.
Office Action for Japanese Patent Application No. 2010-544617 (JP2011-511977 A), Dated Dec. 18, 2012.
PCT Notification Concerning Transmittal of International Preliminary Report on Patentability, PCT Appin. No. PCT/US2006/30173, dated Sep. 4, 2008, 7 Pgs.
The State Intellectual Property Office of the People's Republic of China, "Notification of the 4th Office Action" in Application No. 200980102866.0, Dated May 21, 2014, 10 Pgs.
Bradski et al., "Learning-based Computer Vision with Intel's Open Source Computer Vision Library", Intel Technology, vol. 9, Issue 2, pp. 119-130. Published online May 2005.
Cootes et al., "Active Appearance Models", Proceedings of European Conference on Computer Vision, 1998, (H. Burkhardt and B. Neumann Eds.), Springer, vol. 2, pp. 484-498. Published online 1998.
Corcoran et al., "Automatic Indexing of Consumer Image Collections Using Person Recognition Techniques", Digest of Technical Papers, International Conference on Consumer Electronics, pp. 127-128. Published online Jan. 8, 2005.
Costache et al., "In-Camera Person-Indexing of Digital Images", Digest of Technical Papers International Conference on Consumer Electronics, 2006, pp. 339-340.
Demirkir et al., "Face Detection Using Boosted Tree Classifier Stages", Proceedings of the IEEE 12th Signal Processing and Communications Applications Conference, 2004, pp. 575-578.
Dornaika et al., "Fast and Reliable Active Appearance Model Search for 3-D Face Tracking", Proceedings of Mirage 2003, INRIA Rocquencourt, France, pp. 113-122. Published online Mar. 10-11, 2003.
Drimbarean et al., "Image Processing Techniques to Detect and Filter Objectionable Images Based on Skin Tone and Shape Recognition", International Conference on Consumer Electronics, 2004, pp. 278-279.
Huang et al., "Eye Tracking with Statistical Learning and Sequential Monte Carlo Sampling", Proceedings of the Fourth International Conference on Information, Communications & Signal Processing and Fourth IEEE Pacific-Rim Conference on Multimedia (ICICS-PCM2003), 2003, vol. 3, pp. 1873-1878.
Kotsia et al., "Facial Expression Recognition in Image Sequences Using Geometric Deformation Features and Support Vector Machines", IEEE Transactions on Image Processing, vol. 16, No. 1, pp. 172-187. Published online Jan. 2007.
Rowley et al., "Neural Network-based Face Detection", IEEE Transactions on Pattern Analysis and Machine Intelligence, vol. 20, Issue 1, pp. 23-38. Published Online Jan. 1998.
Saatci et al., "Cascaded Classification of Gender and Facial Expression Using Active Appearance Models", 7th International Conference on Automatic Face and Gesture Recognition (FGR06). IEEE, Published online 2006.
Mola et al., "Rapid Object Detection Using a Boosted Cascade of Simple Features", Proceedings of the 2001 IEEE Computer Society Conference on Computer Vision and Pattern Recognition, 2001, vol. 1, pp. 1-511-1-518.
Mola et al., "Robust Real-time Face Detection", International Journal of Computer Vision, Kluwer Academic Publishers, 2004, vol. 57, Issue 2, pp. 137-154, published online Jan. 10, 2004.
Xin et al., "Real-time Human Face Detection in Color Image", International Conference on Machine Learning and Cybernetics, 2003, vol. 5, pp. 2915-2920.
Yang et al., "Detecting Faces in Images: A Survey", IEEE Transactions on Pattern Analysis and Machine Intelligence, Jan. 2002, vol. 24, Issue 1, pp. 34-58.
Yao et al., "Tracking a Detected Face With Dynamic Programming", Proceedings of the 2004 IEEE Computer Society Conference on Computer Vision and Pattern Recognition Workshops (CVPRW04), 8 pgs. Published online 2004.
Zhao et al., "Face Recognition: A Literature Survey", ACM Computing Surveys, 2003, vol. 35, No. 4, pp. 399-458. Published online Dec. 2003.
Zhu et al., "Fast Human Detection Using a Cascade of Histograms of Oriented Gradients", Proceedings of the 2006 IEEE Computer Society Conference on Computer Vision and Pattern Recognition, IEEE Computer Society, 2006, pp. 1491-1498.

\* cited by examiner

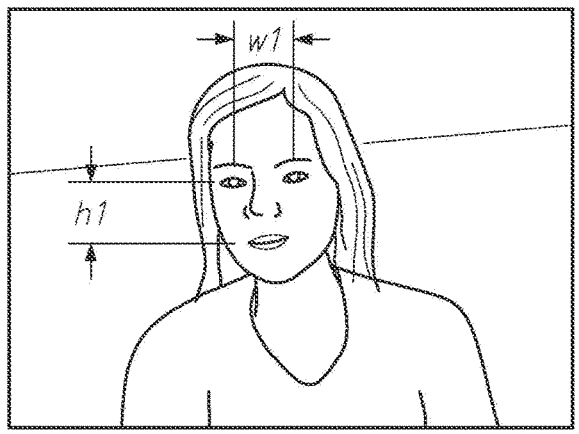
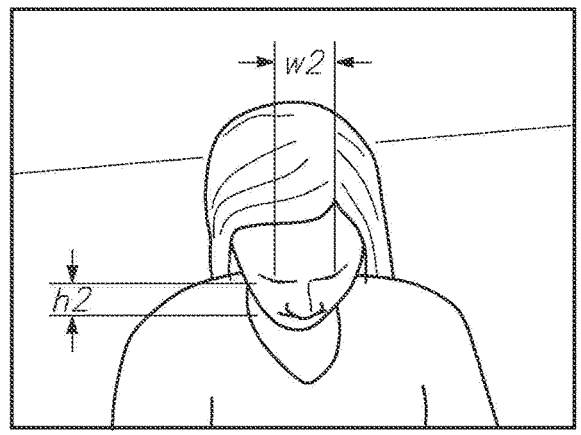
h1 > w1 ( frontal faces )
false smily face
h2 < w2 ( up-down faces )
Note: w1=w2
FIG. 6   FIG. 7

DETECTING FACIAL EXPRESSIONS IN DIGITAL IMAGES

PRIORITY CLAIM AND RELATED APPLICATIONS

This application is a continuation of U.S. patent application Ser. No. 17/643,162, filed Dec. 7, 2021, which is a continuation of U.S. patent application Ser. No. 17/020,535 filed Sep. 14, 2020 and issued on Oct. 11, 2022 as U.S. Pat. No. 11,470,241, which is a continuation of U.S. patent application Ser. No. 15/948,848, filed Apr. 9, 2018 and issued on Sep. 15, 2020 as U.S. Pat. No. 10,778,885, which is a continuation of U.S. patent application Ser. No. 15/284,280, filed Oct. 3, 2016 and issued on Apr. 10, 2018 as U.S. Pat. No. 9,942,470, which is a continuation of U.S. patent application Ser. No. 14/300,150, filed Jun. 9, 2014 and issued on Oct. 4, 2016 as U.S. Pat. No. 9,462,180, which is a continuation of application Ser. No. 12/354,707, filed on Jan. 15, 2009 and issued on Jun. 10, 2014 as U.S. Pat. No. 8,750,578, which claims the benefit under 35 U.S.C. § 119(e) of provisional applications 61/024,508, filed Jan. 29, 2008, entitled, "Methods and Apparatuses For Detecting Facial Expressions in Digital Images and Applications Thereof", and 61/023,855, filed Jan. 27, 2008, entitled, "Blink Detection Method". This application is also related U.S. patent application Ser. No. 11/752,925 filed on May 24, 2007, entitled "Image Processing Method and Apparatus". The entire contents of the above applications are hereby incorporated by reference for all purposes as if fully set forth herein. The applicant(s) hereby rescind any disclaimer of claim scope in the patent application(s) or the prosecution history thereof and advise the USPTO that the claims in this application may be broader than any claim in the parent application(s).

FIELD

Embodiments of the invention relate generally to the field of detecting facial expressions in digital images and applications thereof.

BACKGROUND

It has proven problematic to accurately and automatically identify facial expressions in digital images. Approximately 30% of facial images are images, such as snapshots, representing faces which have various facial expressions. When a conventional face classification apparatus is used to detect faces in general images, the accuracy in detection is lower compared with images which have substantially the same facial expressions. Therefore, there is a problem that the face classification apparatus of prior art schemes cannot accurately detect facial expressions and specific facial expressions-such as smiles, frowns, etc.

SUMMARY OF THE INVENTION

A technique is provided for in-camera processing of a still image including one or more faces as part of an acquisition process. The technique involves identifying a group of pixels that correspond to a face within at least one digitally-acquired image on a portable camera. A collection of relatively lower resolution images including a face are generated in-camera, captured or otherwise obtained in-camera, and the face is tracked within the collection. Cropped versions of multiple images of the collection are acquired. Smile state information of the face is accumulated over the multiple images. A statistical smile state of the face is classified based on the accumulated smile state illumination. One or more smile state-dependent operations are selected based upon results of the analyzing.

Face recognition may be applied to one or more of the multiple images. A relatively short classifier cascade of images may be trained that each include a specifically-recognized person's face. The relatively short classifier cascade may include different poses and illuminations of the specifically-recognized person's face. A pose and/or illumination condition is/are determined, and the relatively short classifier cascade is adjusted base on the determined pose and/or illumination. Image acquisition may be initiated or delayed when the face is or is not recognized as one of one or more specific persons and/or when the face is classified as having a smile or not having a smile.

The technique may further include determining a pose and/or illumination condition for the face, and training a specific set of face classifiers adjusted based on the determined pose and/or illumination condition.

The classifying of the statistical smile state may include assigning a chain of Haar and/or census features.

The identifying of the group of pixels that correspond to a face may include applying approximately the same Haar and/or census features as the classifying.

The cropped versions may each include substantially only a region of the image that includes the face or that only includes a mouth region of the face.

The classifying may include thresholding, such that a classifying result may be one of smile, no smile or inconclusive. The thresholding may include comparing the statistical smile state to a first threshold between 60%-90% likely to be a smile, or to a second threshold of 10%-40% likely to be a smile, or both, with the 60%-90% or more corresponding to a smile result, and with the 10%-40% or less corresponding to a no smile result, and with between the 10%-40% and the 60%-90% corresponding to an inconclusive result. The first threshold may be approximately 80% and the second threshold may be approximately 20%.

The classifying may include calculating a statistical smile difference vector between frames of the collection of relatively lower resolution images, and determining that a certain threshold or more of difference corresponds to a sudden change in pose, illumination, or other image parameter, or to a changing smile state. A particular cause of the certain threshold or more of difference may be confirmed.

Multiple faces may be identified and tracked. Smile state information for each of the multiple faces may be classified. A smile-dependent group shot operation may be initiated if more than a first threshold number of faces is classified as no smile and/or if less than a second threshold number of faces is classified as smile. The smile-dependent group shot operation may include triggering a warning signal to a user or delaying acquisition of a group shot until determining that less than the first threshold number of faces is classified as no smile and/or that more than the second threshold number of faces is classified as smile.

A best smile image may be composited by combining one or more face regions of the at least one digitally-acquired image with a best smile region of one or more of the images of the collection of relatively lower resolution images. The best smile region may include a mouth region with a highest probability of being classified as a smile.

A portable digital image acquisition device is also provided, including a lens and image sensor for acquiring digital images, a processor, and one or more processor-readable media having code embedded therein for programming the processor to perform any of the techniques as described above or below herein.

One or more processor-readable media are provided with code embedded therein for programming a processor to perform any of the techniques as described above or below herein.

A method is also provided for in-camera processing of a still image including one or more faces as part of an acquisition process. A group of pixels is identified that corresponds to a face within at least one digitally-acquired image on a portable camera. The method also includes generating in-camera, capturing or otherwise obtaining in-camera a collection of relatively lower resolution images including a face, and tracking said face within said collection of relatively lower resolution images. Cropped versions of multiple images of the collection are acquired including the face. The method also includes accumulating smile state information of the face over the multiple images. A statistical smile state of the face is classified based on the accumulated smile state information. One or more smile state-dependent operations is/are selected and/or initiated based upon results of the analyzing.

The method may include applying face recognition to one or more of the multiple images.

A pose or illumination condition, or both, may be determined for the face. A specific set of face classifiers may be adjusted based on the determined pose or illumination or both.

The classifying of the statistical smile state may include assigning a chain of Haar and/or census features.

The cropped versions may each include substantially only a region of the image that includes the face or only a region of the image that includes a mouth region of the face.

The classifying may include thresholding, such that a classifying result includes smile, no smile or inconclusive.

The classifying may include calculating a statistical smile difference vector between frames of the collection of relatively lower resolution images, and determining that a certain threshold or more of difference corresponds to a sudden change in pose, illumination, or other image parameter, or to a changing smile state. The classifying may include confirming a particular cause of the certain threshold or more of difference.

Multiple faces may be identified—and tracked. Smile state information for each of the multiple faces may be classified. The method may include initiating a smile-dependent group shot operation if more than a first threshold number of faces is classified as no smile or if less than a second threshold number of faces is classified as smile, or both.

The method may further include compositing a best smile image including combining one or more face regions of the at least one digitally-acquired images with a best smile region of one or more of the images of the collection of relatively lower resolution images.

BRIEF DESCRIPTION OF THE DRAWINGS

The invention may be best understood by referring to accompanying drawings briefly described as follows to illustrate the embodiments:

FIG. 6 illustrates a face looking straight ahead which is classified as non-smile.

FIG. 7 illustrates a face looking down which is also classified as non-smile.

DETAILED DESCRIPTIONS OF SEVERAL EMBODIMENTS

Systems and methods for detecting facial expressions (e.g., smiles), as well as applications for such systems and methods are described. In this description, numerous specific details are set forth. However, it is understood that embodiments of the invention may be practiced without these specific details. In other instances, well-known, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, any claims following the Detailed Description are hereby expressly incorporated into this Detailed Description, with each claim standing on its own as a separate embodiment of this invention.

Embodiments of the invention are applicable in a variety of settings in which it is desired to detect facial expressions in digital images.

For certain embodiments, a binary classifier is created and used for each face to be recognized. That is, samples of a target face are acquired through operation of a face detection algorithm and these samples are used as positive samples for the binary classifier.

Figure 1:
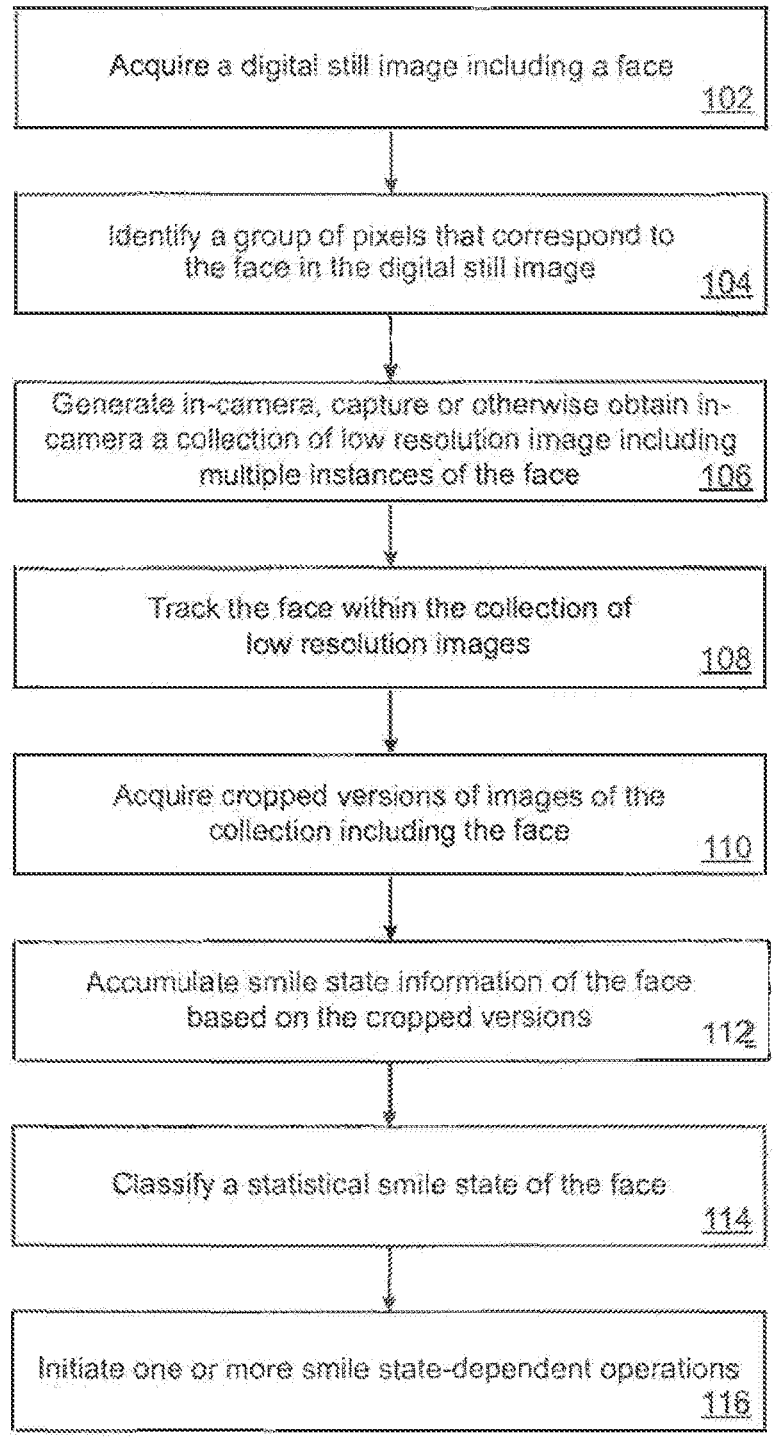
FIG. 1 illustrates a technique of processing a still image including a face.
Figure 2:
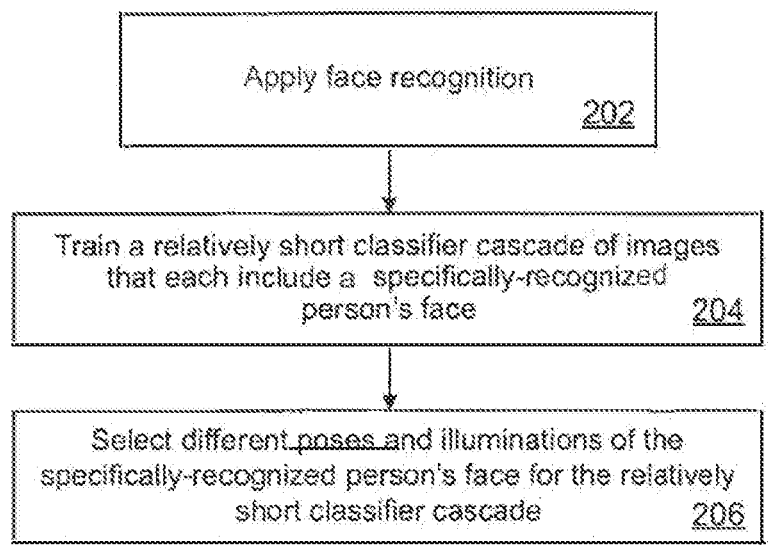
FIG. 2 illustrates a further technique of processing a still image including a face.
Figure 3:
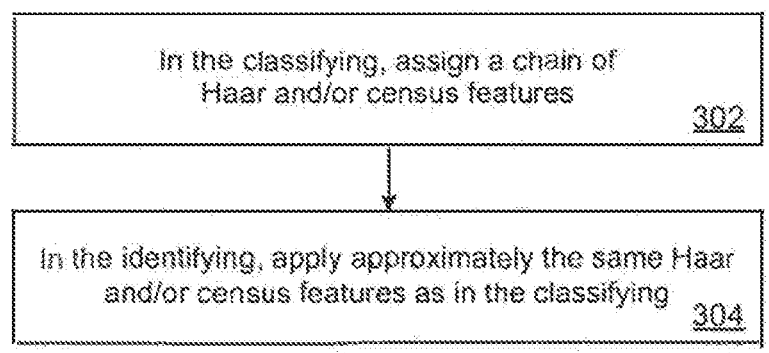
FIG. 3 illustrates specific classifying and identifying processes for use with the technique of FIG. 1.

FIGS. 1-3 illustrate a smile detector in accordance with an exemplary embodiment. Referring first to FIG. 1, a digital still image is acquired that includes a face at block 102. At block 104, a group of pixels is identified that corresponds to the face in the digital still image. At block 106, a collection of low resolution images is generated in-camera, captured or otherwise obtained in-camera including multiple instances of the face. The face is tracked at block 108 within the collection of low resolution images. At block 110, cropped versions are acquired of images of the collection including the face. Smile state information of the face is accumulated based on the cropped versions at block 112. A statistical smile state of the face is classified at block 114. One or more smile state-dependent operations is/are initiated at block 116.

FIG. 2 illustrates a technique including applying faced recognition at block 202. At 'block 204, a relatively short classifier cascade of images is trained that includes a specifically recognized person's face. At block 206, different poses and/or illuminations of the specifically recognized person's face are selected for the relatively short classifier cascade.

FIG. 3 illustrates specific operations that may be used advantageously in the method of FIG. 1. At block 302, in the classifying at block 104, a chain of Haar and/or census features is assigned. At block 304, in the identifying, apply approximately the same Haar and/or census features as in the classifying at block 114.

Smile Detector Based on Face Detector Cascades

Embodiments of the invention employ in-camera training of new classifiers (i.e., instead of reusing the exact detection classifiers), that are used for separating one face from another. In certain embodiments, a binary classifier is built for faces that are and/or should be recognized. This training means that upon user request samples of the target face are acquired by employing a face detection algorithm. These samples are then used as positive samples for a binary classifier. Negative samples are either used from a small collection of generic faces and/or from other previously trained faces, which are stored locally. A relatively short classifier cascade is then trained.

In certain embodiments, the process may be repeated for faces that the user selects for future recognition. In a typical live view mode, the camera will run the tracking algorithm. A new detected face will be compared against the classifiers in the relatively short cascade in the recognition database. Depending on classifier responses and confidence accumulation, over several frames, a voting algorithm will choose one of the database faces or decide that the face does not belong to the recognition set.

In certain embodiments, information from the detection process is used to adjust the recognition process. For one such embodiment, the adjustment of the recognition process is effected dynamically based on the detector/tracker.

In accordance with various embodiments a particular face may have a number of recognition profiles, since the illumination conditions can change the classifier responses quite significantly. When a previously trained face is not correctly recognized under a certain condition, a new recognition profile can be added to that face either automatically or upon user input.

In general, certain embodiments allow the use of detection classifiers to perform recognition based on detection probability. That is, the face detector probability output is used to re-scale the classifiers for the recognizer. For one such embodiment, the detector indicates if a face is a "strong" or "weak" face and then the result is boosted or suppressed in accordance with the indication.

For certain embodiments, smile detection works as an add-on feature to the face tracking algorithm. It will receive as input the face region in the form of a polygon such as a rectangle, or alternatively a square, rhombus, triangle, circle, or otherwise, as well as the already computed integral images and other available maps.

The smile detection algorithm will run a binary classifier on each of the tracked face regions and will decide with a certain degree of confidence whether each of the faces is smiling or not smiling. If the required confidence level to provide an answer is not reached, the smiling-state of the face will be declared as uncertain or unknown. In certain embodiments, the prerequisites for the face may be that it should be frontal, with in-plane orientation close to 0, 90 or −90. However, as described below with reference to FIGS. 6 and 7, different poses can be identified and smiling states can be determined from them.

The smile classifier is the same type of chain with Haar and census features as the face detector. During the training part, it is learned to differentiate between positive smiling samples and negative non-smiling samples. The samples are face crops which are obtained by running the face detector and by automatic cropping based on manual or automatic markings on images with faces. The samples may have the same upright orientation, with slight variations.

In an alternative embodiment of the system the samples could be mouth region crops, which hold most of the useful information for smile classification. Such alternative system involves an additional identification of the mouth region prior to the actual classification. This can be done by running a feature based mouth detector, or identifying the mouth by a maximum color saturation region in the bottom half of the face or another alternative method. This general approach adds an extra level of uncertainty, but may be advantageous in utilizing less data.

The training process may provide a binary classifier chain that can decide the smiling state for a whole face region as it is delivered by the face detector. Smile detection/classification may be executed on individual frames, but the logic spans over several frames as confidence is being accumulated in order to provide a consistent response for a certain face. On a particular frame, the smile classifier runs only on face rectangles (or other polygons) coming directly from the detector, because these are best centered and fitted over the face, before the tracking algorithm re-evaluates the rectangle position. The smile classifier is also evaluated at several slightly shifted positions around the face region.

A confidence based on these neighboring classifications is summed up and thresholded. A smiling decision can be positive, negative or inconclusive. The classifier evaluation is done by the same engine as the one running the face detector, but the smile classifiers are provided instead of the face ones. During a sequence of frames, a smiling confidence parameter assigned to each tracked face, is either incremented or decremented for each positive or, respectively, negative smile response. This confidence parameter may be integer, and may be bound by upper and lower limits such that the smiling decision is responsive enough, and will not lock in a certain state. The confidence parameter is updated after each smile classification (which occurs each frame or at an interval). The final smile state output for a face may be inquired at each frame (may be continuously output), and may be based on the sign and the absolute value of the integer confidence parameter.

In accordance with certain embodiments, an algorithm is capable of detecting smiling frontal faces, as in-camera applications. The algorithm could be viewed as a standalone feature of digital cameras for facial expression detection (e.g., smile or frown detection). Certain embodiments may also be employed in apparatuses or methods involving decisions or further actions based on the presence of a smiling person and may include this algorithm as a decision algorithm.

In an alternative embodiment, Discreet Cosine Transforms (DCTs) are used.

The Training Part of the Algorithm

In certain embodiments, the facial expression to be detected is a smile. There may be two databases, one with smiles, and the other with non-smile, greyscale images. A training algorithm is applied to each database. For one embodiment, the steps of the training algorithm may be identical or substantially the same for both databases. Crops may be used including entire faces or just mouth regions or another subset at least including mouth regions, as outputted from a face detector. In alternative embodiments where blinks are being detected, then just eye region crops may be used or another subset at least including one or both eyes.

Images are read from the database (e.g., as squared crops delivered by the face detection algorithm). Then, for each image, the following steps may be performed:

1. Re-dimension the image to 25×25 pixels. This can be effected using bilinear interpolation, or alternatively bicubic splines.
2. Apply the 2DCT transform:

$$f(u, v) = C(u)C(v)\left[\sum_{x=0}^{(N-1)}\sum_{y=0}^{(N-1)} f(x, y)\cos\frac{(2x+1)u\pi}{2N}\cos\frac{(2y+1)v\pi}{2N}\right]$$

3. Set the pixels in the upper left corner of the transformed matrix (20% of the number of pixels on Ox times 20% of the number of pixels on Oy) to 0.

This corresponds to removing the low frequency coefficients which are related to person features 4. Apply the 2IDCT transform:

$$f(x, y) = \left[\sum_{u=0}^{(N-1)}\sum_{v=0}^{(N-1)} C(u)C(v)F(u, v)\cos\frac{(2x+1)u\pi}{2N}\cos\frac{(2y+1)v\pi}{2N}\right]$$

$$C(u) = \frac{1}{\sqrt{N}}, \quad C(v) = \frac{1}{\sqrt{N}} \quad \text{for } u, v = 0;$$

where:

$$C(u) = \frac{\sqrt{2}}{\sqrt{N}}, \quad C(v) = \frac{\sqrt{2}}{\sqrt{N}} \quad \text{for } u, v = 1 \text{ through } N-1;$$

5. Set all the negative values to 0.

This has the effect of ignoring the values outside of the value range (0 . . . 255 for gray255; 0 . . . 1 for normalized values).

6. Apply an improved histogram equalization:
   a. For each pixel, compute the mean of its horizontal, vertical and diagonal neighbours;
   b. Sort pixels after their grey level, then after the computed mean;
   c. Assign new levels of grey to each pixel;
   d. Re-sort pixels in the original position.

The process will also work with conventional histogram equalization, though the quality of the results may be reduced.

7. Reshape the image to a vector (e.g. using vectorization).

For the whole database, after all images have been reshaped to vectors, perform the following steps:

8. Sort the vectors in 8 clusters using k-means. This is an arbitrary clustering that has been determined empirically to be sufficient to effect an advantageous concept. In general, the clustering may be different as will be appreciated by those skilled in the art.
9. Retain the cluster's centroids.

The training algorithm may be performed offline (i.e., the cluster centroids can be computed a priori and stored in a memory unit).

Figure 4:
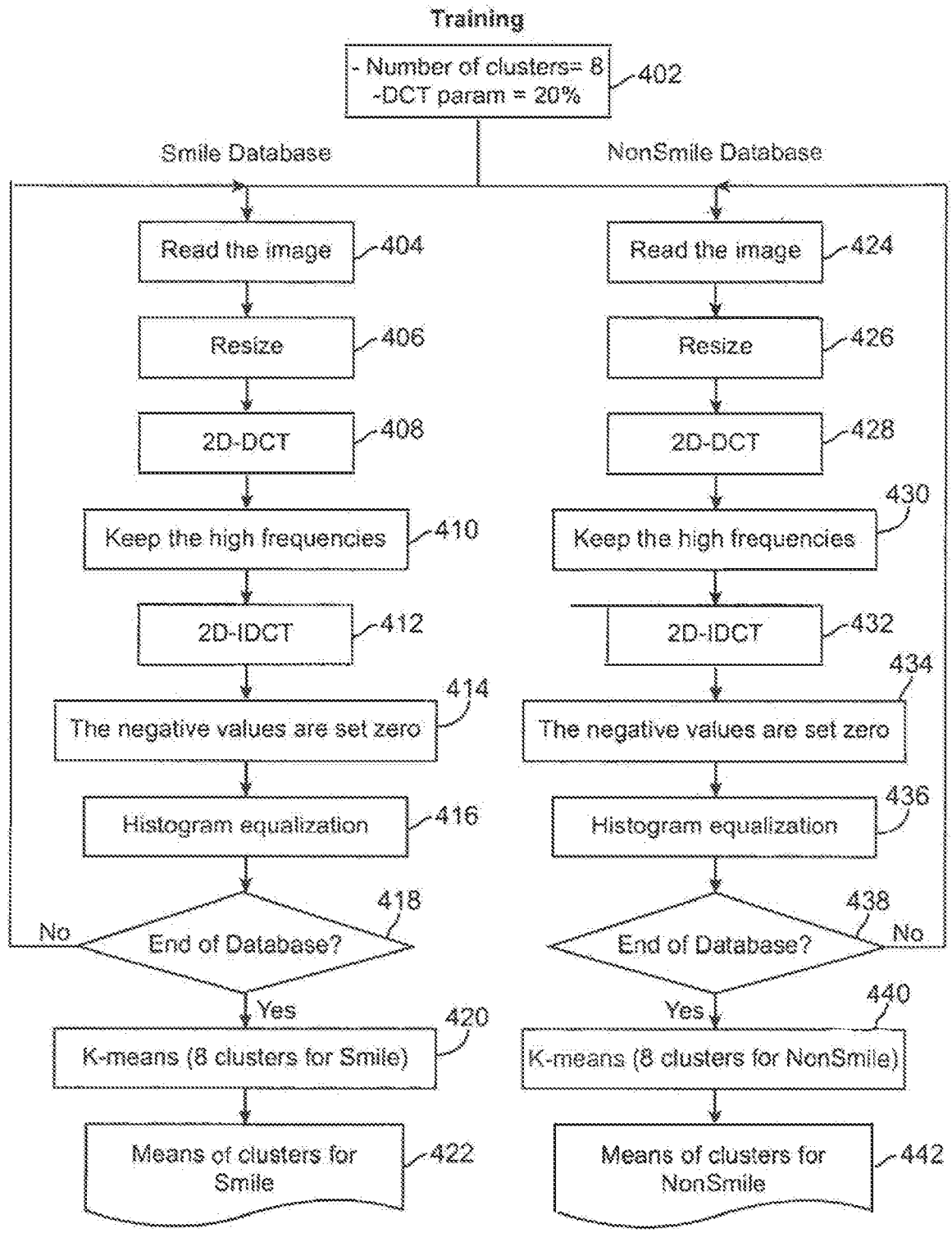
FIG. 4 illustrates an alternative embodiment for training smile and non-smile facial expression classifiers.

FIG. 4 illustrates an example of a training component of a facial expression detection technique. At block 402, parameters are initialized for smile and nonsmile databases, and the number of clusters is set to 8, and the OCT parameter is set to 20%.

For the smile database, an image is read at block 404. Dimensions are changed at block 406. A 2DCT algorithm is applied at block 408 as set forth above. The high frequencies are kept at block 410, and the upper left corner is turned to zero. A 21 OCT algorithm is applied at block 412 as set forth above. Negative values are made zero at block 414. Histogram equalization is performed at block 416, e.g., as described above. It is determined at block 418 whether the smile database is finished. If not, then a next image is read at block 404. If so, then K-means is used to sort clusters at block 420, and means of clusters for smile are calculated at block 422.

For the non-smile database, an image is read at block 424. Dimensions are changed at block 426. A 2DCT algorithm is applied at block 428 as set forth above. The high frequencies are kept at block 430, and the upper left corner is turned to zero. A 21 DCT algorithm is applied at block 432 at set forth above. Negative values are made zero at block 434. Histogram equalization is performed at block 436, e.g., as described above. It is determined at block 438 whether the non-smile database is finished. If not, then a next image is 'read at block 424. If so, then K-means is used to sort clusters at block 440, and means of clusters for non-smile are calculated at block 442.

The Detection/Test Part of the Algorithm

The following sequence may be applied for performing detection of smile or non-smiles (or blinks, etc.).

1. Load the 16 cluster centroids.
2. Read the image to be classified.
3. If necessary, turn it to a grayscale image.
4. Re-dimension the image to 25×25 pixels.
5. Apply the 2DCT transform.
6. Set the pixels in the upper left corner of the transformed matrix (20% of the number of pixels on Ox times 20% of the number of pixels on Oy) to 0.
7. Apply the 2IDCT transform.
8. Set the negative values to 0.
9. Apply the improved histogram equalization.
10. Reshape the image to a vector.
11. Compute the Euclidian distances between the vector and all the clusters centroids.
12. Find the minimum distance.
13. Assign to the test image the same label (Smile or NonSmile) as the images within the closest cluster.

For certain embodiments, the number of clusters (e.g., S clusters for each database) may be varied. Additionally, or alternatively, the number of pixels made 0 after 2DCT (in this case 5×5 pixels) may be varied.

Figure 5:
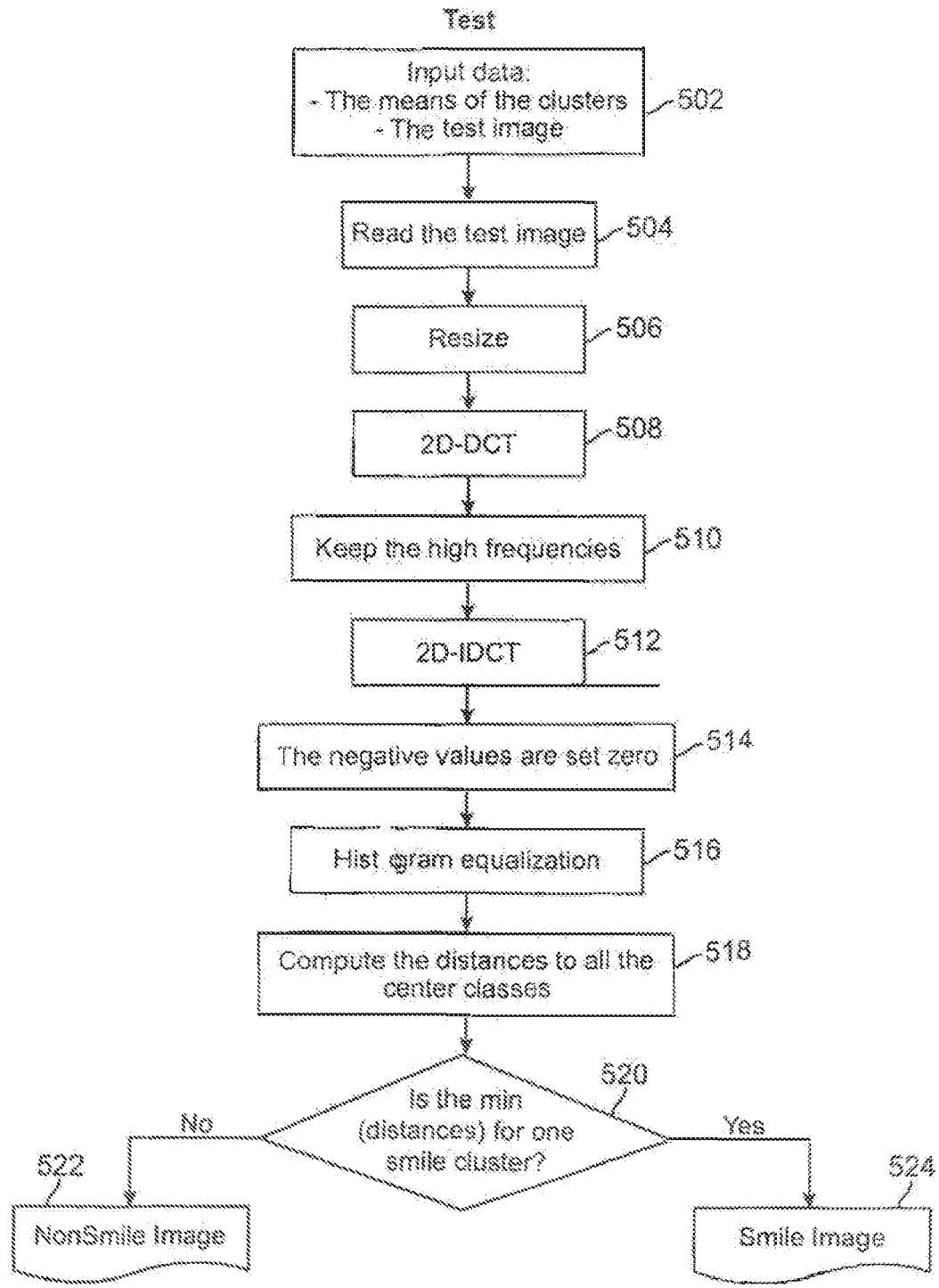
FIG. 5 illustrates an alternative embodiment for testing with trained classifiers whether an image includes a face with a smile.

FIG. 5 illustrates an example of a detection component of a facial expression detection technique. At block 502, data is input including means of the clusters from the example of FIG. 4 and a test image. The test image is read at block 504. Dimensions are changed at block 506. A 2DCT algorithm is applied at block 508 as set forth above. The high frequencies are kept at block 510, and the upper left corner is turned to zero. A 21 DCT algorithm is applied at block 512 as set forth above. Negative values are made zero at block 514. Histogram equalization is performed at block 516, e.g., as described above. Distances to the center classes are computed at block SIS. It is determined at block 520 whether minimum distances exist for a smile cluster. If not, then the image is classified as a non-smile image at block 522. If so, then the image is classified as a smile image at block 524.

Alternative Implementations

As will be appreciated by those skilled in the art, many alternative embodiments of the invention are possible. For example, the principle embodiment describes a technique that determines the smile/no-smile state of a face region within a digital image. It is implicit that a face tracking/face detector has been run on the image and that knowledge of the location of face region(s) within the analysed image is made available to the "smile detector". This technique can be applied both within a digital camera given sufficient computing resources, and may be implemented partly within the camera (e.g. face detection) and partly outside the camera (e.g. smile detection using derived and saved face detection information), or in certain embodiments both the face detection process and the smile detection are used to post-process previously acquired images.

Where the invention is implemented entirely within the camera various improvements to the operation of the invention can be achieved. In particular, the digital camera may acquire a constant stream of preview and/or postview images, and where a face tracking algorithm is embodied within the camera, then information about the determined face regions within each frame of the preview stream is available on a real-time basis. Where the present algorithm is sufficiently optimized, it can be applied in real-time either in parallel with, or sequentially following the application of the face tracker algorithm. Such an embodiment enables (i) improvements in the smile detection process itself and (ii) additional operational features to be provided to a user of the camera.

With respect to item (i) and referring to the computing of Euclidian distances between the vector and cluster centroids, and to the finding of minimum distance per steps 11 & 12 of the above-described exemplary embodiment, where such a real-time smile detection algorithm is implemented, it is possible to compute the smile/no-smile state of a tracked face region and to accumulate this state information over multiple pre-acquisition frames. This enables statistical analysis of the smile/no-smile state of a face and is useful to avoid confounding factors such as sudden changes in illumination and/or face pose which may degrade the accuracy of the smile detection algorithm. Thus, sudden inter-frame fluctuations in the smile feature vector can be ignored until the feature vector stabilizes.

In one embodiment in addition to calculating the smile feature vector for each frame, and determining its smiled/no-smile state, the algorithm calculates a difference vector between subsequent frames of the preview/postview image stream. Where this is greater than a certain threshold it may either be interpreted as indicating a sudden change in external illumination or pose (which may be confirmed by the exposure determining subsystem of the camera for the case of illumination, or by the face-lock characterization of the face tracking algorithm) or it may be interpreted as a transition between smile and no-smile states (which may be confirmed by analysis of subsequent preview/postview frames).

In alternative embodiments, a running average of the smile feature vector may be calculated and this averaged feature vector is used to determine the smile/no-smile state of a face region over multiple preview frames.

In yet a further embodiment, the distances between the current smile feature vector and both the nearest smile centroid and the nearest no-smile centroid are calculated for each preview frame. The ratio between these two distances is analyzed statistically over several frames and used to determine a smile/no-smile' probability measure rather than a simple smile/no-smile state measure. Thus where a smile feature vector is a normalized distance of 0.2 from the nearest smile centroid and a distance of 0.8 from the nearest no-smile centroid it is 80% likely to be a smile or 20% likely to be not a smile. In a variation on this embodiment the log of the normalized distance is used to calculate a probability rather than the normalized distance itself.

With respect to item (ii) above, where the smile detection process is operable on a preview/postview stream, it is possible to monitor state transitions of tracked face regions. This enables, for example, a camera to implement an improved "group shot" feature, where an image is captured when everyone in a preview frame is determined to be smiling.

In other embodiments, the camera could issue a warning beep if one or more people are not smiling (the "smile guarantee" feature); or acquisition could delayed until everyone (or a plurality or certain percentage or certain number) are determined to be smiling.

In embodiments where additional image reconstruction and/or compositing and/or super-resolution algorithms are available within the camera then face regions, or portions thereof, from one or more preview frames may be combined with the main acquired image to ensure that a final, composited image presents the "best smile" for each detected face. The judging of the quality of a smile may be achieved using a smile/no-smile probability as described above.

Metadata relating to the smile/no-smile state or smile probability may be stored/saved with other information relating to the relevant tracked face region.

FIGS. 6 and 7 illustrate a further embodiment. In both of the photos illustrated at FIGS. 6 and 7, the subject is not smiling and not blinking. In FIG. 6, the no smile, no blink state of the subject may be detected using a variety of geometrical and/or learning techniques. However, inferior techniques can tend to falsely detect the subject as smiling and blinking in FIG. 7, even though the subject is not smiling and not blinking. Because the subject is looking down in FIG. 7, it can appear that the subject's lips are curved upward on the outsides just like a smiling mouth would appear on a face in a frontal, non-tilted pose. The subject can also appear to be blinking or sleeping or otherwise have her eyes closed in FIG. 7, because no part of her eye balls is showing.

Based on the triangle eyes-mouth (smoothed by the face tracking algorithm on more frames), it is determined in this embodiment whether the face orientation is in the plane (RIP) and out of the plane (ROP). Based on this information, smile acceptance/rejection thresholds are adjusted dynamically in this embodiment.

The smile detection threshold may be relaxed on different rotations or plane (RIP) angles, or a smile detection may be applied on a precise angle (by rotating the crop image or the classifiers) and having stronger smile classifiers on 0(+/−5) degrees. [Note: Now they are more relaxed in the training process=>0(+/−20) degrees.]

A stronger smile detection threshold may be placed when the faces are up-down (pitch rotation). Note: Up-down faces can otherwise tend to lead to a large-percentage of false smile detections.

This same idea can also be applied to adjust dynamic blink acceptance/rejection thresholds.

Applications

As noted above, there are many applications for embodiments of the invention that detect smiles in digital images. Further applications are possible where two or more sensors are implemented within a digital image acquisition device. In accordance with one embodiment of the invention where at least one additional sensor is implemented in the device and that sensor faces the user (e.g., photographer), an image of the photographer may be acquired as the photographer is in the process of acquiring an image. Such an embodiment allows the production of a diptych which includes the photographer as well as the image acquired by the user.

When employed with facial expression detection, such an embodiment may allow the image acquisition device to acquire an image upon recognition or detection of a given facial expression (e.g., smile) of the user (e.g., photographer). This allows the motion associated with typical press-button image acquisition schemes to be reduced.

Similarly, embodiments of the invention can be employed to review and categorize acquired images or images as they are being acquired based upon the facial expressions of the user or a subsequent reviewer. For example, the facial expressions (indicating emotions) of the person(s) reviewing photos are detected. If the reviewing person(s) smile, then the image is auto tagged as a keeper or a preferred image. If the image gets multiple "smile" reviews over time, then its preferred score goes up. The list of preferred images can be used for playback on the camera where preferred images are presented first over lesser preferred images as a playback mode.

For certain embodiments, this concept of emotion determination based upon facial expression detection is broadened as follows. Smiling and other facial expressions are used for tagging on, personal computers, documents, videos, establishing entry points or tags of interest in video. Such PC applications could be effected for cameras mounted in the displays of personal computers for example.

In accordance with certain embodiments, data processing uses a digital processing system (DPS). The DPS may be configured to store, process, and communicate, a plurality of various types of digital information including digital images and video.

As discussed above, embodiments of the invention may employ a DPS or devices having digital processing capabilities. Exemplary components of such a system include a central processing unit (CPU), and a signal processor coupled to a main memory, static memory, and mass storage device. The main memory may store various applications to effect operations of the invention, while the mass storage device may store various digital content.

The DPS may also be coupled to input/output (I/O) devices and audio/visual devices. The CPU may be used to process information and/or signals for the processing system. The main memory may be a random access memory (RAM) or some other dynamic storage device, for storing information or instructions (program code), which are used by the CPU. The static memory may be a read only memory (ROM) and/or other static storage devices, for storing information or instructions, which may also be used by the CPU. The mass storage device may be, for example, a hard disk drive, optical disk drive, or firmware for storing information or instructions for the processing system.

GENERAL MATTERS

Embodiments of the invention provide methods and apparatuses for detecting and determining facial expressions in digital images.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An image processing method, comprising:
   acquiring a plurality of images using a portable image acquisition device;
   identifying and tracking a plurality of faces in the plurality of images;
   applying a facial expression detection process to each identified and tracked face in the plurality of faces;
   classifying, based on the facial expression detection process, a facial expression state for each tracked face;
   generating a composite image by replacing, in a given image from the plurality of images, a face region for a given face in the plurality of faces with a face region of the given face in a different image from the plurality of images, where the face region of the given face in the different image depicts a different facial expression than the face region in the given image;
   causing display of the composite image via a display coupled to the portable image acquisition device.

2. The method of claim 1, wherein acquisition of the plurality of images comprises initiating a group-shot operation when at least one transition in a classified facial expression state is detected, wherein the at least one transition is selected from the group consisting of:
   a transition from a non-smile to a smile;
   a transition from a smile to a non-smile;
   a blink of one eye; and
   a blink of both eyes.

3. The method of claim 1, wherein the facial expression detection process is a smile detection process that has been trained with sample images of known smiling faces and sample images of known non-smiling faces as input.

4. The method of claim 3, further comprising:
   classifying smile state information for each of the plurality of faces; and
   initiating a group-shot operation if more than a first threshold percentage of faces is classified as smile, or if less than a second percentage of faces is classified as no-smile.

5. The method of claim 3, further comprising delaying the group-shot operation until determining that less than a first threshold number of faces is classified as no-smile.

6. The method of claim 3, further comprising:
determining that a particular percentage of the plurality of faces are smiling; and
initiating a group-shot operation in response to determining that the particular percentage is above a threshold percentage.

7. The method of claim 3, further comprising:
recording the composite image as digital content in a storage medium.

8. The method of claim 1, wherein the facial expression detection process is executed on an individual image in the plurality of images.

9. The method of claim 1, wherein for a particular image, the facial expression detection process runs only on face regions of the image.

10. The method of claim 1, further comprising identifying a mouth region of a tracked face using a feature based mouth detector.

11. The method of claim 1, further comprising:
analyzing a face orientation of each tracked face to determine whether the face orientation is in the plane or out of the plane; and
dynamically adjusting smile acceptance/rejection thresholds based on the analysis.

12. The method of claim 1, further comprising performing in-device training of new classifiers used to separate one face from another.

13. The method of claim 1, further comprising applying face recognition to at least one image in the plurality of images.

14. An image processing device, comprising:
a processor; and
a processor-readable media having code embedded therein for programming the processor to:
acquire a plurality of images using a portable image acquisition device; identifying and tracking a plurality of faces in the plurality of images;
apply a facial expression detection process to each identified and tracked face in the plurality of faces;
classify, based on the facial expression detection process, a facial expression state for each tracked face;
generate a composite image by replacing, in a given image from the plurality of images, a face region for a given face in the plurality of faces with a face region of the given face in a different image from the plurality of images, where the face region of the given face in the different image depicts a different facial expression than the face region in the given image;
display of the composite image via a display.

15. The image processing device of claim 14, wherein the facial expression detection process is executed on an individual image in the plurality of images.

16. The image processing device of claim 14, wherein for a particular image, the facial expression detection process runs only on face regions of the image.

17. The image processing device of claim 14, wherein acquisition of the plurality of images comprises initiating a group-shot operation when at least one transition in a classified facial expression state is detected, wherein the at least one transition is selected from the group consisting of:
a transition from a non-smile to a smile;
a transition from a smile to a non-smile;
a blink of one eye; and
a blink of both eyes.

18. The image processing device of claim 14, wherein the facial expression detection process is a smile detection process that has been trained with sample images of known smiling faces and sample images of known non-smiling faces as input.

19. The image processing device of claim 14, wherein the code further programs the processor to record the composite image as digital content in a storage medium.

20. The image processing device of claim 14, wherein the code further programs the processor to identify a mouth region of a tracked face using a feature based mouth detector.

21. An image processing method, comprising:
acquiring a stream of images using a portable image acquisition device; and
performing the following steps in real-time as the stream of images is acquired by the portable image acquisition device:
identifying and tracking a plurality of faces in the stream of images;
applying to each identified and tracked face in the plurality of faces, a facial expression detection process that has been trained with sample images as input;
classifying, based on the facial expression detection process, a facial expression state for each tracked face;
assigning, based on the facial expression detection process, a confidence parameter to each classified facial expression state for each tracked face;
delaying recording of an image until a number of non-smiling faces in a subsequently acquired image is less than a threshold;
initiating a group-shot operation to capture and record at least one image based on the classifications and confidence parameters satisfying the threshold;
causing display of the at least one image via a display coupled to the portable image acquisition device;
when the number of non-smiling faces in the subsequently acquired image is less than the threshold, forming a composite image, based on the subsequently acquired image and one or more of the other images, to further reduce the number of non-smiling faces by replacing a face region in the subsequently acquired image with a face region in one of the one or more other images; and
recording the composite image as digital content in a storage medium.

* * * * *